United States Patent Office 2,973,300
Patented Feb. 28, 1961

2,973,300

PROCESS FOR MAKING ANTIBIOTIC-ENZYME TOPICAL FILM-FORMING COMPOSITIONS

George E. Farrar, Jr., Gladwyne, and Marvin I. Hersh and John O. Barnett, Philadelphia, Pa., assignors to American Home Products Corporation, New York, N.Y., a corporation of Delaware No Drawing. Filed May 7, 1956, Ser. No. 582,942

2 Claims. (Cl. 167—65)

This invention relates to a medicinal composition and more particularly relates to a medicinal composition for the treatment of tropical phagedenic ulcers or the like.

Phagedenic ulcer is a disorder found widely in tropical and sub-tropical areas of the world, which, while not fatal, causes suffering and disfigurement. Tropical ulcer has been described as a rapidly spreading ulcer that usually occurs on the lower extremities of the body and is often accompanied by considerable pain, local edema, a tenacious slough and a serosanguinous, foul-smelling discharge, the edges of the ulcer being undermined and the margins raised. The ulcer may start from practically any small surface wound produced, for example, by insect bite or abrasion and resulting in a spreading ulcer in two to three days.

The treatment for tropical ulcer in the past has been largely unsatisfactory since the remedies either sought to overcome simply the bacteriological findings or the histopathological picture or attempted a partial alleviation of both without a clear understanding of all the factors of the disease. Liquid or ointment compositions that have been described by Spier and Cliffton in "Sur. Gynecology and Obstetrics," 98, 667–674 (1954), while stated to be effective for the treatment of chronic leg ulcers unfortunately fall short of a satisfactory medicament for the treatment of tropical phagedenic ulcers.

A study of tropical ulcers indicated the need for a multiple attack in order to obtain a satisfactory medicinal composition. The objectives to be achieved included the complete clearing of the infection, the removal of the tenacious slough, the alleviation of pain, the prevention of the spread of the ulcerous area and finally the establishment of an environment conducive to granulation and re-epithelialization to repair the generally massive tissue destruction found in cases of tropical ulcers.

Considering the infective agents first, the causative agents of infection of tropical ulcers were found to be invariably fusiform bacilli and treponema organisms. In In addition to these, one could also find various bacteria of the gram-positive and gram-negative type including *Pseudomonas aeruginosa*, *Proteus vulgaris*, *Staphylococcus albus* and *aureus* and streptococci of the hemolytic and non-hemolytic type. The medicinal agent must obviously therefore comprise suitable antibacterial substances effective against the organisms likely to be found.

A notable characteristic of ulcers of the general class described is the formation of a "pseudo-membrane" probably composed of dead cells, bacteria and other debris, bound together in a matrix of fibrin under which the bacteria swarms. In the case of chronic, indolent ulcers, there has also been observed a cartilage-like appearance of the base. It is necessary to destroy or debride the membrane or slough in order to open the area to the medicament and consequently a suitable agent or agents must be incorporated in the composition in order to permit the antibacterial component to become effective.

As noted previously, another factor to be considered is the general incidence of pain which accompanies the ulcerous condition and it is necessary to stop or at least alleviate the pain as soon as possible. An effective composition should at least not itself cause irritation or pain while in use and at best should be able to immediately relieve the painful trauma.

In order to fulfill the requirements noted hereinabove, and taking into consideration all of the factors involved, we have found a particular composition that is highly successful in treating and curing tropical ulcers.

The composition of the invention is a dry powder comprising selected antibiotics to clear the area of all infectious agents, hyaluronidase as a spreading agent for the medicament but which also coacts with a specific proteolytic enzyme component to achieve substantially complete debridement of the wound, and a diluent carrier as a film-forming agent, capable of hydrating easily, without caking or gumming.

More specifically, the composition contains an antibiotic component comprising essentially a combination of neomycin and polymyxin B salts together with bacitracin in amounts, per gram of composition, of approximately 3.5–25 mg. of neomycin, 1,000–10,000 units of polymyxin and 50–3,000 units of bacitracin. The salts must be water-soluble and are generally the sulfates which are commercially available, although salts of other acids having similar characteristics are not excluded.

The antibiotics selected for the composition of the invention are designed to be effective against all the bacterial flora to be expected in tropical ulcers. While a single wide spectrum antibiotic such as oxytetracycline chlortetracycline might be considered a simple and obvious solution to the problem instead of the three antibiotics chosen, it has been found that the wide spectrum antibiotics are inadequate against the organisms present in these ulcers and produce substantial irritation with possible ulceration when used either parenterally or topically. In the present invention, the combination of neomycin and polymyxin has been found highly effective and more than additive in their effect on resistant pseudomonas organisms associated with tropical ulcers. Also, combinations of neomycin and bacitracin have been stated by others to demonstrate a synergistic action against certain bacteria. Finally, bacitracin by itself is a recognized useful antibiotic against gram-positive organisms, particularly the penicillin-resistant staphylococci.

The hyaluronidase component should be present in an amount ranging from about 12–200 TRU (turbidity reducing units) per gram of composition, the higher amounts being used under conditions involving poor blood supply at the wound site. This low range of enzyme has been found to be highly effective, probably because of the procedure for intimate commingling with the diluting agent as described below.

In order to achieve complete lysis and debridement of the crust or membrane that is substantially always encountered, so that the antibiotic components may be fully effective, and to permit the formation of granulation tissue, the composition includes either trypsin or chymotrypsin. Other enzymes falling in the same general class are not satisfactory since these have a limited range of substrates upon which they work and therefore cannot be depended upon to remove the slough. The selected proteolytic enzyme is used in the composition of the invention in a range from about 4 mg. to as high as about 500 mg. per gram. Actually the lowest amounts are sufficiently effective to accomplish the results desired.

The carrier or diluting agent may be either dextran or polyvinylpyrrolidone (PVP), the latter being particularly preferred because of its surprisingly superior qualities as a film-forming agent which almost immediately alleviates the pain, and its stabilizing effect on hyaluronidase. Both dextran and PVP have the advantage of not gumming when water is present and both hydrate easily without caking. The carrier is used in an amount as much as is needed to make up the difference in weight of the other ingredients for producing the dosage unit selected. Thus, the minimum amount used on a one gram basis is estimated to be about 413 mg. with the highest limit being not over about 991 mg. per gram of therapeutic product. The polyvinylpyrrolidone or dextran selected for the composition is one having a molecular weight in the range of about 10,000 to 100,000 although a narrower range of about 25,000 to 50,000 is preferred. The latter range, insofar as PVP is concerned, is also identified as type K26-36.

With regard to the method of preparation of the novel composition, it is necessary, because of stability reasons, to insure a dry product containing under about 2% moisture. Also, in view of the small amount of antibiotic and enzyme components relative to the amount of carrier, a uniform and intimate admixture of the components must be made. The first objective is achieved by reducing the moisture content of the antibiotic and proteolytic enzyme components to a very low value, well under 2% moisture and preferably at about the 0.5% level, before mixing with the hyaluronidase and the carrier. The second objective involves intimate admixture, particularly of the hyaluronidase with the carrier. This cannot be achieved with dextran to the same satisfactory extent as with PVP. With the latter, a procedure has been developed which insures intimate admixture while concomitantly permitting lower amounts of enzymes for substantial effectiveness. This involves solubilizing the hyaluronidase and the PVP in water and then lyophilizing the solution to a very low moisture content. The hyaluronidase is therefore fully and evenly dispersed and thus coacts with the antibiotics and enzymes in making them fully effective at substantially reduced concentrations. The anhydrous product is then mixed with the other dried components under conditions of low relative humidity.

The following example illustrates in detail the procedure for obtaining a dosage unit of a suitable composition falling within the scope of the invention.

*Example*

Under conditions of less than 30% relative humidity, dry antibiotics in the amount of 200 units of bacitracin, 1,000 units of polymyxin B sulfate and 5 mg. of neomycin sulfate calculated as base are intimately mixed with 2 mg. of chymotrypsin. The mixture is comminuted so that all the retained product will pass through a 100-mesh screen.

Using distilled water, a 10% w./v. solution of hyaluronidase (100 TRU plus 50 TRU for overage) and polyvinylpyrrolidone (Type K26-36) in an amount of approximately 488 milligrams is made up and the solution is immediately lyophilized to obtain a substantially anhydrous product in which uniform distribution of the enzyme has been effected. The enzyme powder is screened to pass through a 100 mesh screen and the screening operation is carried out in an area maintained at less than 30% relative humidity.

The antibiotic-enzyme mixture is then intimately blended with the hyaluronidase-polyvinylpyrrolidone mixture under the stated low humidity conditions as a 500 mg. dosage unit and the blended material is packaged in a moisture-proof container.

The total amount of moisture in the product to obtain at least a year of shelf-life should not be more than about 2% by weight. Obviously a lower moisture content would increase the life of the product. The need for a low-moisture content product is based on the fact that both hyaluronidase and bacitracin are unstable in an aqueous or even moist environment.

The product is best utilized in the dry form as a free-flowing dusting powder, and if kept under relatively moisture-proof conditions will be effective for a substantial length of time. However, if it is desired to use the composition as an aqueous solution with wet dressing, the solution, which is easily prepared, must be used immediately due to the inherent instability of some of the ingredients. Moreover, the film-forming effect of the carrier is lost.

While the composition of the invention has been designed especially for the treatment of tropical phagedenic ulcers, it is also useful as a topical medicament for other types of ulcers, surface wounds in general and infected burns.

We claim:

1. A process for preparing a substantially dry therapeutic composition containing an antibiotic component, a proteolytic enzyme, hyaluronidase, and a diluent film-forming carrier comprising first drying all the components of the composition to a moisture content under about 2% by weight, and then admixing the antibiotic component, the proteolytic enzyme, the hyaluronidase and the diluent, film-forming carrier, the mixing being carried out in a zone held at less than about 30% relative humidity.

2. A process for preparing a substantially dry therapeutic composition comprising separately drying an antibiotic component and a proteolytic enzyme, and then mixing the two ingredients, dissolving hyaluronidase and polyvinylpyrrolidone in an aqueous medium and then lyophilizing the solution to a substantially anhydrous powder, and finally intimately admixing said anhydrous powder with the first admixture.

References Cited in the file of this patent

UNITED STATES PATENTS

| | | |
|---|---|---|
| 2,749,274 | Buckwalter | June 5, 1956 |
| 2,809,149 | Cusumano | Oct. 8, 1957 |

FOREIGN PATENTS

| | | |
|---|---|---|
| 523,745 | Belgium | Nov. 14, 1953 |

OTHER REFERENCES

Lesser: D. and C. Ind., July 1954, pp. 32, 33, 127–130.

Lesser: D. and C. Ind., April 1945, pp. 442–445, 520, 522 (p. 443 pert.).

Am. Dyestuff Reporter 43:6, p. 27A (advertisement), March 15, 1954.

Plasdone: Gen. Aniline and Film New Product Bull. No. P-100, pp. 5–22 (pp. 5, 12, 19 esp. pert.), June 15, 1951.

Lesser: D. and C. Ind., 71:2, pp. 178, 179, 250–254, August 1952.

Cooper et al.: A.M.A. Arch. of Surgery, vol. 71, pp. 268–274, August 1955.

Spier: ". . Treatment of Chronic Leg Ulcers with Hyaluronidase, Plasminogen, and Antibiotics," Surgery, Gynec. and Obstet., June 1954, pp. 667–674.

Heilesen: ". . Therapeutic Effect of Trypsin," J. Invest. Derm., July 1954, pp. 7–15.

Policitracina, Unlisted Drugs, November 1954, p. 118 (Ointment containing Neomycin, Bacitracin and Polymyxin).

Armstrong: Liquefaction of Viscous Purulent Exudates by Deoxyribonuclease," The Lancet, December 9, 1950, pp. 739–742.